Aug. 20, 1929.  C. BITTNER  1,725,328
POWER TRANSMITTING MECHANISM
Original Filed Oct. 6, 1926  2 Sheets-Sheet 1

Inventor
C. Bittner
By Lacey & Lacey, Attorneys

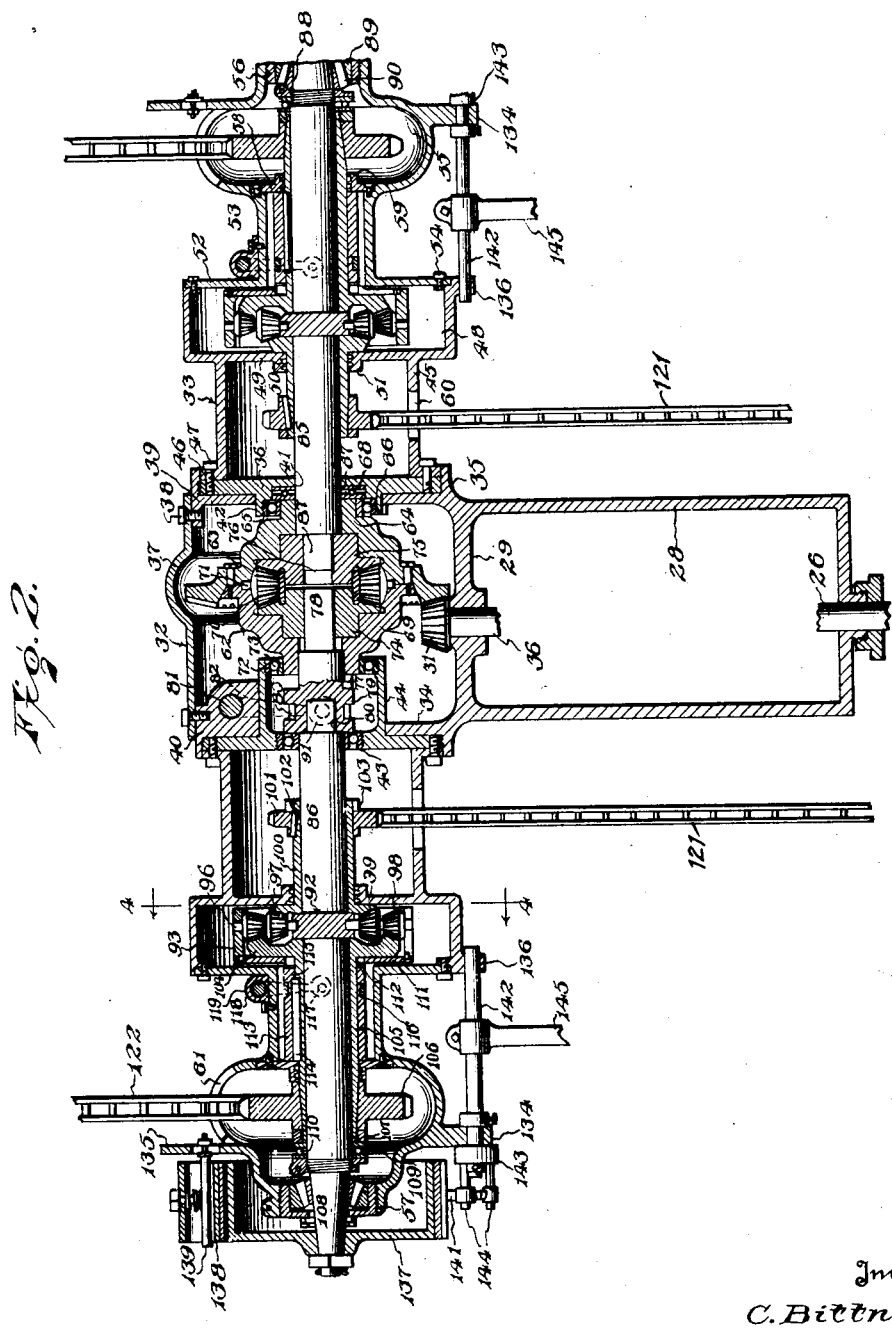

Patented Aug. 20, 1929.

1,725,328

UNITED STATES PATENT OFFICE.

CHRISTIAN BITTNER, OF ELWOOD, OREGON.

POWER TRANSMITTING MECHANISM.

Original application filed October 6, 1926. Serial No. 139,901. Divided and this application filed June 16, 1927. Serial No. 199,310.

My invention relates to new and useful improvements in power transmitting mechanism for self-propelled vehicles and is a division of my copending application for differential for automobiles, filed October 6, 1926, Serial No. 139,901.

In carrying out my invention, I employ a balanced differential mechanism of more or less conventional type to which are operatively connected two jack shaft sections, each of which carries an unbalanced differential mechanism which in turn drives two sprocket carrying sleeves, power being transmitted from one of these sprockets to the adjacent rear wheel and from the other of these sprockets to the adjacent forward wheel.

In this connection, a still further object of my invention consists in the provision of a novel form of lock for the balanced differential mechanism and of novel forms of locks for the unbalanced differential mechanism, together with means for simultaneously applying or disengaging all of these locks.

With these and other objects in view, my invention will be more fully described, illustrated in the accompanying drawings, and then specifically pointed out in the claims which are attached to and form a part of this application.

In the drawings:

Figure 2 is a horizontal sectional view taken through the differential mechanism.

Corresponding and like parts are referred to in the following description and indicated in all the views of the drawings by the same reference characters.

Figure 1:
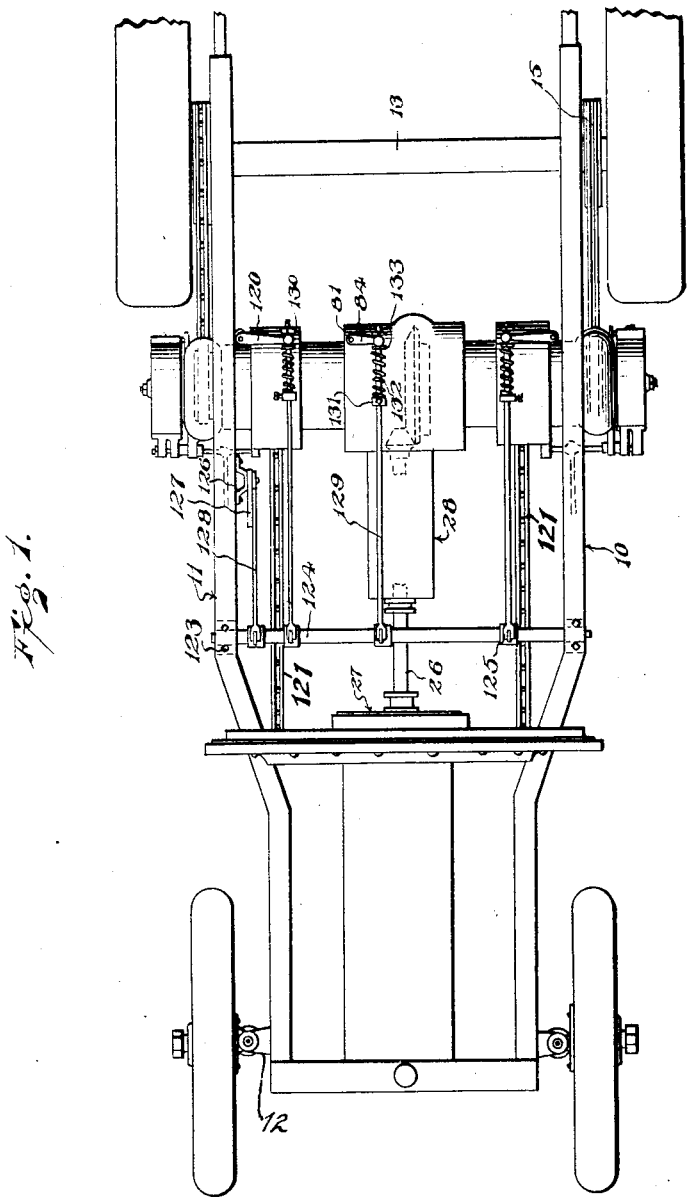
Figure 1 is a top plan view of a conventional form of motor vehicle running gear, showing my improved power transmission mechanism in place.

In order to insure a clear and accurate understanding of my invention and the manner of employing it, I have illustrated its construction in connection with a conventional type of motor vehicle running gear including side frame members 10 and 11 supported in the customary manner above the front and rear axles 12 and 13, both of these axles, in the present case, being of the type commonly known as "dead" axles. Revolvably mounted upon the free ends of the rear axle 13 are the rear driving wheels 14, each of which carries a sprocket wheel 15 by means of which they may be driven.

The drive shaft section 26 leads from a clutch 27, of conventional type, through the forward end of a transmission housing 28, being connected to any suitable form of multiple gear transmission contained in such housing, no such transmission being shown as it forms no part of the present invention. This transmission housing is provided short of its rear end with a transverse wall 29 and the drive shaft section 30 from the transmission mechanism is journaled in a bearing formed in this wall, being provided immediately at the rear of the wall with the beveled drive pinion 31.

Broadly speaking, the housing of the differential mechanism, which consists primarily in a central portion 32 and symmetrically formed end portions 33, is secured directly to the rear end of the transmission housing 28, such end of the housing being extended as shown at 34 to seat in the forward portion of the intermediate or central housing member 32 and being provided exteriorly and peripherally with a stop flange 35 against which such portion of the differential housing seats. This central portion of the differential housing includes a main body portion 36 open at its forward end to receive the free end of the transmission housing 28 and closed at its rear end by a cap plate 37 secured by bolts or other suitable means 38, this cap plate being secured by certain of the bolts directly to the body of the housing and by certain other bolts to reinforcing brackets 39 and 40. The body portion 36 of the housing is provided at one side with an opening 41 and surrounding such opening and interiorly of the housing with an annular flange 42, the purpose of which will be later explained. At the other side, the body portion of the housing is provided with a somewhat larger opening 43 and interiorly with an annular surrounding flange 44 which projects a considerable distance into the housing.

As the side portions of the differential housing are identical in construction, a description of one will suffice for both. Each side portion includes a hollow body 45 provided at one end with a laterally directed flange 46 to receive bolts 47 by means of which it may be secured to the adjacent side portion of the central housing member, surrounding the opening therein. This body portion 45 is enlarged at its free end as shown at 48 and between such enlarged portion and the main portion is provided with a partition wall 49 having a central opening forming a bearing 50 provided with lubricating channels 51. The free outer end of this body portion 45 is channelled to receive the laterally directed flange 52 of a second body portion 53, bolts 54 being passed through this flange and into the body portion 45 to secure the two together. This body portion 53 is provided intermediate its length with an enlargement 55, the free end of which is provided with an internally threaded opening 56 to receive the thrust cap 57. A bearing plate 58 is bolted or otherwise secured across the body portion 53 and provided with a shaft receiving bore having lubricant grooves 59. The forward sides of the body portions 45 are provided with openings 60, while the rear sides of the body portions 55 are provided with openings 61, these openings being formed for a reason which will be hereinafter apparent.

The central differential mechanism, which is a balanced differential mechanism, indicated as a whole by the numeral 62, includes the beveled driving gear 63, meshing with the driving pinion 31 and having a cylindrical hub portion 64 concentrically disposed within the flange 42, a ball race 65 having ball bearings 66 being interposed between the flange 42 and this hub to take up wear and properly support one of the drive shaft sections, as will be later explained. Spaced discs 67 are interposed between the outer end of the hub portion 64 and the adjacent side of the differential housing and an annular packing ring 68 is clamped between these plates to prevent leakage of oil from one housing section to the other. Secured to the inner face of the driving gear 63, is a somewhat similarly formed member 69 which, together with the driving gear, forms, as best shown in Figure 2 of the drawings, a cage for the idler pinions 70 of the differential mechanism, these pinions being mounted for free turning movement upon stub shafts 71 carried by the cage and extending inwardly and radially thereof, three or more of these openings being provided. The hub portion of the member 69 projects into the outer end of the annular flange 44 and a ball race 72 having ball bearings 73 is interposed between such flange and hub to properly support that end of the differential cage. The beveled gears 74 and 75, which mesh with the pinions 70, are enclosed in the cage as is customary and are provided with alined squared bores 76.

Seated within the space provided by the flange 44 is a clutch shaft 77, the inner end of which is reciprocally mounted in the hub portion of the member 69 of the differential cage, such end terminating in a squared portion 78 which lockingly engages in the squared bore of the beveled gear 74, being so proportioned that when the shaft 77 is moved to innermost position, it will also project into the inner end of the squared bore of the gear 75, to lock the gears 74 and 75 together. The outer end of this locking shaft 77 is provided with a peripherally grooved head 79 having a concentrically formed squared socket 80.

A vertical shaft 81 is journaled for rotation in the bracket 40, extending through the upper wall of the differential housing and interiorly of such housing carries a shipper lever in the form of spaced arms 82, the terminals of which engage in the groove of the shaft head as shown at 83, the flange 44 being slotted for their admission. The outer end of the shaft 81 carries a lever arm 84 by means of which the shaft may be turned to cause reciprocation of the locking shaft 77 to move it into position to lock the gears 74 and 75 to each other or in position to permit independent movement of such gears.

The counter or drive jack of my improved transmission mechanism is formed in two sections 85 and 86. The inner portion of the section 85 is journaled in the opening 41 of the differential housing and in the hub portion 64 of the driving gear 63, said end terminating in a squared extension 87 seating in the outer portion of the beveled gear 75 of the transmission mechanism 62. The outer end of this shaft section 85 is beveled somewhat to receive the inner race member 88 of a bearing race of which the outer race member 89 seats in the thrust cap 57, cone bearings 90 being interposed between these race members.

The shaft section 86 is identical in construction with the shaft member 85 except that it is shorter, and that its inner squared end 91 seats in the squared socket 80 of the locking shaft 77, this socket and squared terminal being so proportioned that a portion of the squared terminal will, at all times, seat in the socket, irrespective of the position of the locking shaft.

In addition to the above described differential mechanism, my invention also comprehends the employment of two unbalanced differential mechanisms located one upon either side of the differential previously described, one being mounted upon the shaft 85 and the other upon the shaft 86, as will now be explained. As both of these differential mechanisms are identical in construction, a description of one will suffice for both. A differential cage, indicated as a whole by the numeral 92, is keyed upon each of the shaft sections 85 and 86, said cages being located in the housing members 48. Each cage includes a hub portion and a rim portion 93, connected to the hub portion by a web formed with radial slots. Shafts 96 are journaled at their ends in the rim and hub portions of each cage, extending radially across the slots of the web portions and each of these shafts has fixed thereto inner and outer beveled gears 97 and 98, the former being one or more teeth larger than the latter. A beveled gear 99 meshes with the beveled gears 97, being either formed on or secured to one end of a sleeve 100, the opposite end of which extends into the portion 45 of the differential housing to receive a sprocket wheel 101 secured by a key 102 and a clamp nut 103. A beveled gear 104 meshes with all of the beveled gears 98 of each differential and is either keyed upon or formed integrally with a sleeve 105 which extends into the enlarged portion 55 of the differential housing to receive a sprocket wheel 106 secured by a key and a clamp nut 107. This latter sleeve is held against outward movement along the shaft by means of a locking collar 108 threaded upon the shaft section through which the sleeve extends and clamping discs 109 between it and the sleeve, a packing ring 110 being interposed between these discs. As best shown in Figure 2, these sprocket wheels 106 are considerably larger than the sprocket wheels 101.

Each of the differential cages 92 carries a locking plate 111 which is secured to its rim portion and which is provided centrally with a squared opening 112. A locking sleeve 113 is reciprocally mounted about the sleeve 105, having a key and keyway connection therewith as shown at 114 and this sleeve is provided with a squared inner end 115, which, in one position of the sleeve, may seat in the squared opening 112 of the locking plate 111. The sleeve is provided adjacent this squared end with a peripheral channel to seat the band 116 of a shipper lever mechanism 117. This shipper lever is carried by a shaft 118 journaled in a bracket 119 carried by the differential housing and a lever 120 is keyed upon the outer end of this shaft.

Drive chains 121 are trained about the sprockets 101 and sprockets (not shown) associated with the front axle, while drive chains 122 are trained about the sprockets 15 and 106.

Journaled in bearings 123, carried by the side frame members 10 and 11 of the vehicle, is a shaft 124 having a plurality of upwardly directed lever arms 125, one in alinement with the free ends of each of the levers 120 and one in alinement with the free end of the lever 84. The frame member 11 also carries a bracket 126 upon which is pivotally mounted a hand lever 127 having any suitable form of latch and the free end of this hand lever is connected to still another of the lever arms 125 by a link 128. Links 129 are pivotally connected to the upper ends of the other lever arms 125 with their rear ends slidably disposed in the free ends of the lever arms 120 and lever arm 84. Nuts, or other fastening devices 130, are secured upon the rear ends of these links 129 and collars 131 are adjustably secured upon the links somewhat in advance of the lever arms 120 or the lever arm 84, as the case may be. Helical springs 132 surround the links between these collars and the adjacent lever arms, washers 133 being preferably interposed between the springs and lever arm.

From the foregoing description, it will be clear that proper manipulation of the hand lever 127 will force all of the links 129 rearwardly, causing the springs 132 to exert pressure against the lever arms against which they engage. Under these circumstances, the central differential will be locked by forcing the squared terminal of the locking shaft 77 into the squared bore 76 of the beveled gear 75 and the other differential mechanism will be locked by the forcing of the squared terminals of their locking sleeves 113 into the squared bores of the locking plates 111. The springs 132 permit the hand lever to be swung rearwardly to its full extent, irrespective of whether the locking members are in proper position to engage each other or not and force coacting locking members into locking engagement as soon as they reach such relative position. Upon swinging the hand lever in the opposite direction, all of the differential mechanisms are simultaneously unlocked.

From the foregoing description, taken in connection with the drawings, the operation of my improved transmission mechanism and its differential mechanisms will be readily understood. The central differential mechanism permits the wheels at one side of the vehicle to revolve at a higher rate of speed than the wheels at the other side, when the vehicle is moving in a curve, while the unbalanced differentials at either side permit the front and rear wheels to revolve at different rates of speed when going around a curve, this being necessary as it is well known that the front and rear wheels of a self-propelled vehicle do not follow the same path except when the car is going in a straight line.

The locks for the differentials are of considerable importance as in a four-wheel drive of the above type, if any one of the wheels begins to spin without having tractive engagement with the road bed, all the other wheels could remain stationary and the vehicle would be stalled. Under these conditions, the vehicle may be started by locking the differentials when, for the time being, a positive uniform drive will be transmitted to all the wheels. It will be of course understood that the differential mechanisms should be unlocked as soon as the vehicle is again in motion.

Although I have illustrated and described my invention in all its details, it will of course be understood that I do not wish to in any way be limited to such details, as various minor changes, within the scope of the appended claims, may be made at any time, without in the slightest degree departing from the spirit of my invention.

Formed on the enlarged portions 35 of the body portions 53 at their forward sides are ears 134 while at their rear sides said body portions are provided with slotted lugs 135, and formed on the enlarged portions 48 of the body portions 45 to aline with the ears 134 are ears 136. Fixed to the outer ends of the shaft members 85 and 86 are brake drums 137, surrounding which are brake bands 138, and adjustable on the lugs 135 are posts 139 mounting said bands. The bands are provided with lugs 140 which accommodate links 141, and journaled through the ears 134 and 36 are brake shafts 142 provided at their outer ends with heads 143. Fixed to said heads are eccentrically disposed pins 144 engaged by the links 141. The shafts 142 carry levers 145 which may be operated in any approved manner for rocking said shafts and tightening the brake straps about the brake drums for applying the brakes and, as will be seen, the restraint of the brakes will be communication to all four wheels of the vehicle.

Having thus described the invention, I claim:

An unbalanced differential mechanism for motor vehicles including a driven shaft, a differential cage fixed to the shaft, sleeves rotatable on the shaft at either side of the cage, beveled gears fixed to the sleeves, said beveled gears being of unequal size, idler beveled gears operatively supported by the cage pinions and engaging such beveled gears, there being one set of idler pinions for each beveled gear, the pinions of the two sets being mounted in pairs upon common shafts carried by the cage, the cage being provided concentrically of the shaft with a squared opening, and a sleeve mounted about one of the differential sleeves to turn therewith, said sleeve having sliding movement, one end of the sleeve being squared to engage in the squared opening in the cage to lock the differential mechanism.

2. An unbalanced differential mechanism for motor vehicles including a driving shaft, a differential cage fixed to the shaft and having gears therein, a plate carried by the cage and having a square opening formed therein, sleeves rotatable on the shaft at either side of the cage, beveled gears fixed to the sleeves adapted to mesh with the gears of the cage, a sleeve slidably interlocked with one of the first named sleeves and having a squared end for engaging in the opening of the plate, as and for the purpose set forth.

In testimony whereof I affix my signature.

CHRISTIAN BITTNER. [L. S.]